May 30, 1961   J. A. LOWRY   2,986,383
MEANS FOR DIFFUSING A GAS IN A LIQUID
Filed April 10, 1958

INVENTOR;
JOHN A. LOWRY,
BY David Young
ATT'Y.

United States Patent Office 2,986,383
Patented May 30, 1961

2,986,383
MEANS FOR DIFFUSING A GAS IN A LIQUID

John A. Lowry, Columbus, Ohio, assignor to The Jeffrey Manufacturing Company, a corporation of Ohio Filed Apr. 10, 1958, Ser. No. 727,580
5 Claims. (Cl. 261—124)

This invention relates to the treatment of a liquid by the diffusion of a gas through the liquid, and more specifically to an improved device which is adapted to be immersed in a tank of liquid and to supply the gas to the liquid in the form of fine bubbles, causing the gas to diffuse through the liquid whereby the absorption of the gas by the liquid is facilitated.

It is the prime object of the instant invention to provide an improved device for introducing a gas into a liquid in the form of small bubbles, to diffuse the gas through the liquid, for absorption of the gas by the liquid.

It is a further object of the instant invention to provide an improved means for treating a liquid by the diffusion therethrough of a gas in the form of small bubbles, comprising an improved gas chamber adapted to be immersed in the liquid for introducing the gas thereto.

It is another object of the instant invention to provide improved means for treating a liquid by the introduction thereto of gas in the form of small bubbles to diffuse through the liquid for absorption of the gas by the liquid, comprising an improved gas chamber into which the gas is introduced under pressure, the gas chamber being formed with a port for the discharge of the gas and a valve for normally sealing the port, the valve having a flexible element which is separated from contact with the gas chamber by the pressure of the gas in the gas chamber, to permit the gas to exhaust from the gas chamber in the form of fine bubbles.

It is still another object of the instant invention to provide an improved gas chamber adapted to be immersed in a body of liquid for releasing gas to that liquid to be absorbed thereby, said gas chamber being of substantially cylindrical configuration and including a port of substantial size formed in a chordal plane of the gas chamber, having a valve overlying the port and including a flexible element abutting the gas chamber adjacent the port to normally seal the latter, the pressure of the gas in the gas chamber acting to release the flexible element to permit the gas to discharge from the gas chamber in the form of fine bubbles and to diffuse through the liquid.

It is also an object of the instant invention to provide an improved gas chamber adapted to be immersed in a body of liquid for introducing a gas to the liquid in the form of fine bubbles, in which the gas chamber includes a valve which is maintained in pressure contact with the gas chamber to normally seal the port thereof, and including means for adjusting the pressure contact of the valve with the gas chamber, the pressure of the gas in the gas chamber separating the valve from the gas chamber to permit the discharge of gas from the gas chamber to the liquid in the form of small bubbles to diffuse therethrough.

Other objects of the invention will appear hereinafter, the novel features and combinations being set forth in the appended claims.

The instant invention relates to the treatment of a liquid by the diffusion of a gas through the liquid to be absorbed thereby. Such treatment may occur in a sewage plant in which the water containing the sewage is treated by the introduction of air to the water to be absorbed thereby, which augments the supply of oxygen in the water and encourages the action of bacteria in decomposing the sewage contained therein. In water plants the water is similarly treated for purification by the introduction of chlorine to the water to be absorbed thereby for the purpose of destroying harmful bacteria. In the treatment of water by the introduction of gas to be absorbed thereby it is generally desirable that the gas be introduced to the water in the form of fine bubbles, which will most readily diffuse through the water and will facilitate the absorption of the gas by the water.

Figure 1:
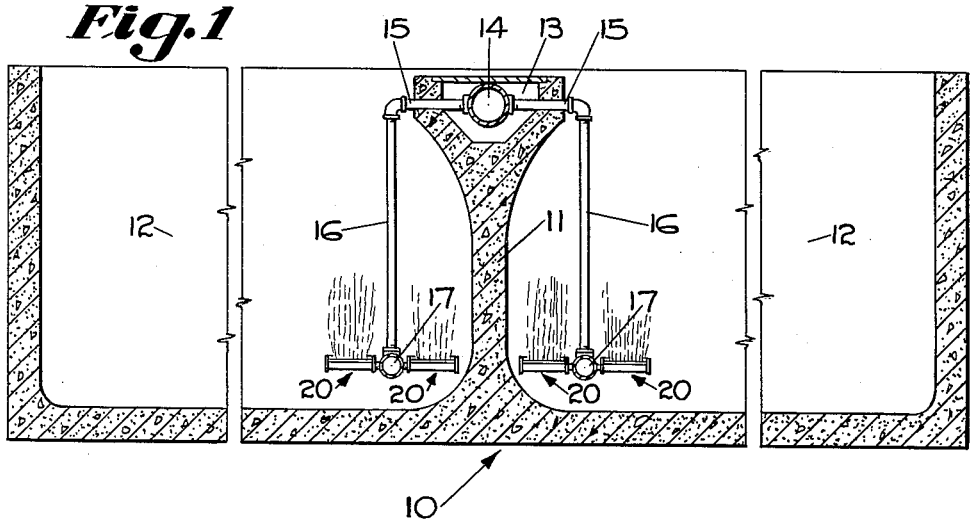
Fig. 1 is a transverse sectional view of a water treatment tank incorporating the instant invention.

Referring to the drawings, the invention is illustrated as incorporated in apparatus for the treatment of water, which may be in a sewage plant or in a water plant. In Fig. 1 there is illustrated a two-compartment water tank 10 having a central wall 11 running along the middle of the tank 10 for the full length thereof and forming the two compartments 12, each of which is normally filled with water. At the top of the wall 11 there is formed a compartment 13, extending the length of the wall 11, and in which there is disposed a header 14 for the gas which is to be introduced into the water. At various points along the length of the header 14, there are provided individual pipes 15 which are connected to the header 14 and extend laterally therefrom through the central wall 11 into the compartments 12 of the tank 10. Each pipe 15 has connected thereto a vertical pipe 16 which leads downwardly to the bottom of the compartments 12 of the tank 10.

Each vertical pipe 16 in the compartments 12 is connected to a manifold 17 formed of a length of pipe, a plurality of manifolds 17 being provided in each compartment 12, such manifolds 17 being arranged in line with each other for the full length of the tank 10. At a plurality of points along the length of each manifold 17 there is provided a laterally extending gas chamber 20 which is connected to the manifold 17 for the reception of gas under pressure therefrom. At each point along the manifold 17 where there is located a gas chamber 20, there is provided a pair of gas chambers 20 which extend laterally from the manifold 17, with one gas chamber 20 being disposed on each side of the manifold 17.

Figure 2:
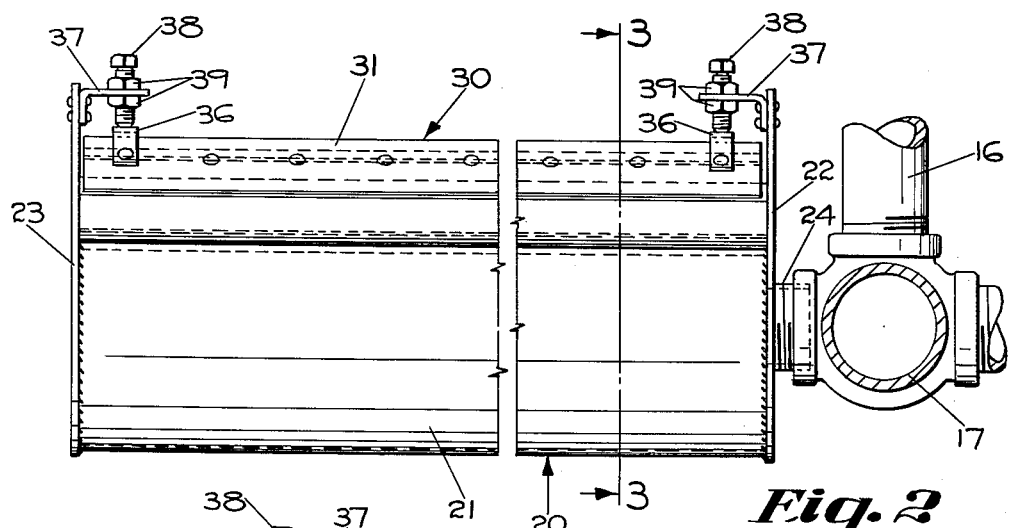
Fig. 2 is an elevational view of the gas chamber of the instant invention.
Figure 3:
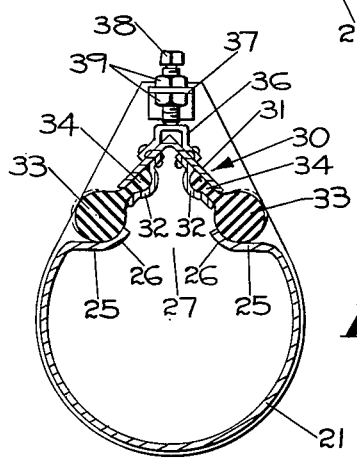
Fig. 3 is a sectional view of the gas chamber taken on the line 3—3 in Fig. 2.

Referring to Figs. 2 and 3, in which the gas chamber 20 is illustrated in detail, it is seen that the gas chamber 20 comprises a substantially cylindrical shell 21, which is closed at one end by a perforate end plate 22, and at the opposite end by an imperforate end plate 23. The perforate end plate 22 has secured thereto a pipe fitting 24 which in turn is fitted to the manifold 17, to form a connection from the manifold 17 to the interior of the gas chamber 20.

The shell 21 of the gas chamber 20 includes ends 25, Fig. 3, which are turned in towards each other in a chordal plane, and are formed with laterally curved marginal portions, which constitute valve seats 26, as will be described in greater detail hereinafter.

Between the valve seats 26, which are spaced a substantial distance from each other, there is provided an opening of substantial size forming a port 27 for the discharge of gas from the gas chamber 20. Above the port 27 there is provided a valve 30 which normally seals the port 27. The valve 30 comprises a rigid backing member 31, which may be formed from an angle element, and is disposed with its apex directed away from the port 27. The backing member 31 extends the length of the gas chamber 20, and to each of the legs thereof facing the port 27 there is secured a clip 32, extending the length of the backing member 31. The valve 30 further includes a flexible element 33 having a substantially cylindrical configuration, which is complementally formed with respect to the valve seat 26. The flexible element 33 is continuous and extends the full length of the gas chamber 20. The flexible element 33 includes an integral, laterally extending arm 34, which is adapted to be received between the clip 32 and the backing member 31 of the valve 30. The flexible element 33 is assembled in the valve 30 by sliding the arm 34 thereof longitudinally in between the backing member 31 and the clip 32. Thus the flexible element 33 may be replaced should it wear out after long usage. In the preferred embodiment of the invention the flexible element 33 is formed of neoprene, which is alkali and acid-resistant, and provides good service in the gas chamber 20 of this invention.

It is seen in Fig. 3 that the flexible elements 33 of the valve 30 are arranged in diverging relation to each other, and abut the shell 21 of the gas chamber 20, seating against the valve seats 26, being complementally formed with respect thereto. Thus, the flexible elements 33 in engagement with the valve seats 26 normally act to seal the port 27 of the gas chamber 20. The gas in the gas chamber 20 is supplied thereto under pressure, and the force thereof on the flexible elements 33 cause these elements to separate from engagement with the valve seats 26, the flexible elements 33 bending at the junction of the radial arms 34 and the main body of the flexible elements 33, providing a restricted passage for discharge of the gas from the gas chamber 20 to the liquid contained in the compartments 12 of the tank 10. The passage for the gas formed between the flexible elements 33 and the valve seats 26 being restricted, causes the gas to leave the gas chamber 20 in the form of fine bubbles which readily diffuse through the liquid in the compartments 12 of the tank 10, and thereby facilitates the absorption of the gas by the liquid.

At each of the opposite ends of the backing member 30 there is provided a shoe 36 which is secured thereto. A bracket 37 is secured to each of the end plates 22, 23 and overlies the shoes 36. A bolt 38 extends through each bracket 37 and the end of the bolt 38 engages a shoe 36 and bears thereagainst. The bolts 38 provide pressure for holding the valve 30 in position on top of the shell 21 of the gas chamber 20, with the flexible elements 33 in contact with the valve seats 26. The bolts 38 are locked in position by nuts 39. The bolts 38 permit the position of the valve 30 to be adjusted, and thereby the pressure of the flexible elements 33 on the valve seats 26 may be regulated, and to provide a control of the rate of discharge of the gas from the gas chamber 20 to the liquid, as well as controlling the size of the bubbles of gas.

The gas chamber of the instant invention for introducing a gas into a body of liquid provides a structure which is not subject to clogging, whereby the operation thereof is not affected by any of the various materials that may be contained in the liquid. The novel gas chamber further provides for a continuous discharge of gas along the full length thereof without obstruction, and by adjustment of the pressure of the valve on the shell of the gas chamber the discharge of the gas may be controlled.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Apparatus for treatment of liquid by the diffusion of a gas through the liquid to be absorbed thereby, a gas chamber for introducing the gas into the liquid, said gas chamber comprising a perimetal wall having opposite wall end portions turned in towards each other and the edge of each wall end portion being laterally curved to form an outwardly facing concave valve seat, said valve seats being spaced from each other to form a port therebetween for discharge of gas from the chamber, a valve assembly overlying the port for normally sealing the port and the gas chamber, said valve assembly comprising a backing member spaced above the port, said blocking member having depending legs directed towards the valve seats, a valve element for each valve seat comprising a sealing portion complementally curved with respect to a valve seat to sealingly abut a valve seat for sealing the port, each valve element including a flexible arm secured to a leg of the backing member for supporting the valve element in the valve assembly with the complementally curved portion of the valve element sealingly abutting the valve seat, an adjustable threaded element supported on the gas chamber and abuttingly engaging the backing member for holding the valve assembly in position on the gas chamber with the valve elements in sealing engagement with the valve seats and permitting adjustment of the valve elements relatively to the valve seats, and the pressure of the gas in the gas chamber acting to separate the valve elements from the valve seats by flexure of said flexible arms to form a restricted exhaust passage between the complementally curved portion of each valve element and its valve seat for exhaust of gas from the gas chamber through said restricted exhaust passages in small bubbles for diffusion of the gas through the liquid to be absorbed by the liquid.

2. Apparatus for treatment of liquid by the diffusion of a gas through the liquid to be absorbed thereby, a gas chamber for introducing the gas into the liquid, said gas chamber comprising a perimetal wall having opposite wall end portions turned in towards each other and the edge of each wall end portion being laterally curved to form an outwardly facing concave valve seat, said valve seats being spaced from each other to form a port therebetween for discharge of gas from the chamber, a valve assembly overlying the port for normally sealing the port and the gas chamber, said valve assembly comprising a backing member spaced above the port, said backing member having depending legs directed towards the valve seats, a valve element for each valve seat comprising a sealing portion complementally curved with respect to a valve seat to sealingly abut a valve seat for sealing the port, the complementally curved portions of the valve elements and the valve seats cooperating by engagement of the valve elements with the valve seats to locate the valve assembly with respect to the port, means abuttingly engaging the backing member for holding the valve assembly on the gas chamber, each valve element including an integral flexible arm secured to a leg of the backing member for supporting the valve element in the valve assembly with the complementally curved portion of the valve element sealingly abutting the valve seat and the pressure of the gas in the gas chamber acting to separate the valve elements from the valve seats by flexure of said flexible arms to form a restricted exhaust passage between the complementally curved portion of each valve element and its valve seat for exhaust of gas from the gas chamber through said restricted exhaust passages in small bubbles for diffusion of the gas through the liquid to be absorbed by the liquid.

3. Apparatus for treatment of liquid by the diffusion of a gas through the liquid to be absorbed thereby, a gas chamber for introducing the gas into the liquid, said gas chamber comprising a perimetal wall having opposite wall end portions turned in towards each other and the edge of each wall end portion being laterally curved to form an outwardly facing concave valve seat, said valve seats being spaced from each other to form a port therebetween for discharge of gas from the chamber, a valve assembly overlying the port for normally sealing the port and the gas chamber, said valve assembly including a valve element for each valve seat, each valve element comprising a sealing portion complementally curved with respect to a valve seat to sealingly abut a valve seat for sealing the port, each valve element including a flexible arm for supporting the valve element in the valve assembly with the complementally curved portion of the valve element sealingly abutting the valve seat and the pressure of the gas in the gas chamber acting to separate the valve elements from the valve seats by flexure of said flexible arms to form a restricted exhaust passage between the complementally curved portion of each valve element and its valve seat for exhaust of gas from the gas chamber through said restricted exhaust passages in small bubbles for diffusion of the gas through the liquid to be absorbed by the liquid.

4. Apparatus for treatment of liquid by the diffusion of a gas through the liquid to be absorbed thereby, a gas chamber for introducing the gas into the liquid, said gas chamber comprising a substantially cylindrical wall having opposite wall end portions turned in towards each other in a chordal plane and the edge of each wall end portion being laterally curved to form an outwardly facing concave valve seat, said valve seats being spaced from each other to form a port therebetween for discharge of gas from the chamber, a valve assembly overlying the port for normally sealing the port and the gas chamber, said valve assembly including a valve element for each valve seat, each valve element comprising a sealing portion complementally curved with respect to a valve seat to sealingly abut a valve seat for sealing the port, each valve element including an integral flexible arm for supporting the valve element in the valve assembly with the complementally curved portion of the valve element sealingly abutting the valve seat and the pressure of the gas in the gas chamber acting to separate the valve elements from the valve seats by flexure of said flexible arms to form a restricted exhaust passage between the complementally curved portion of each valve element and its valve seat for exhaust of gas from the gas chamber through said restricted exhaust passages in small bubbles for diffusion of the gas through the liquid to be absorbed by the liquid.

5. Apparatus for treatment of liquid by the diffusion of a gas through the liquid to be absorbed thereby, a gas chamber for introducing the gas into the liquid, said gas chamber comprising a longitudinally extending perimetal wall having opposite wall end portions turned in towards each other and the edge of each wall end portion being laterally curved to form an outwardly facing concave valve seat, said valve seats being spaced from each other to form a longitudinally extending port therebetween for discharge of gas from the chamber, a valve assembly overlying the port for normally sealing the port and the gas chamber, said valve assembly comprising a rigid backing member spaced above the port and extending along the port, said backing member having depending legs directed towards the valve seats, a valve element for each valve seat comprising a sealing portion complementally curved with respect to a valve seat to sealingly abut a valve seat for sealing the port, each valve element including an integral flexible arm secured to a leg of the backing member for supporting the valve element in the valve assembly with the complementally curved portion of the valve element sealingly abutting the valve seat and the pressure of the gas in the gas chamber acting to separate the valve elements from the valve seats by flexure of said flexible arms to form a restricted exhaust passage between the complementally curved portion of each valve element and its valve seat for exhaust of gas from the gas chamber through said restricted exhaust passages in small bubbles for diffusion of the gas through the liquid to be absorbed by the liquid.

References Cited in the file of this patent

UNITED STATES PATENTS

| Re. 8,780 | Badger et al. | July 1, 1879 |
| 87,728 | Taws | Mar. 9, 1869 |
| 1,969,644 | Gavett | Aug. 7, 1934 |
| 2,415,048 | Sharp | Jan. 28, 1947 |
| 2,546,213 | Clemmons | Mar. 27, 1951 |
| 2,687,287 | Coppock | Aug. 24, 1954 |

FOREIGN PATENTS

| 781,036 | France | Feb. 18, 1935 |
| 897,256 | France | May 22, 1944 |